Figure 1:
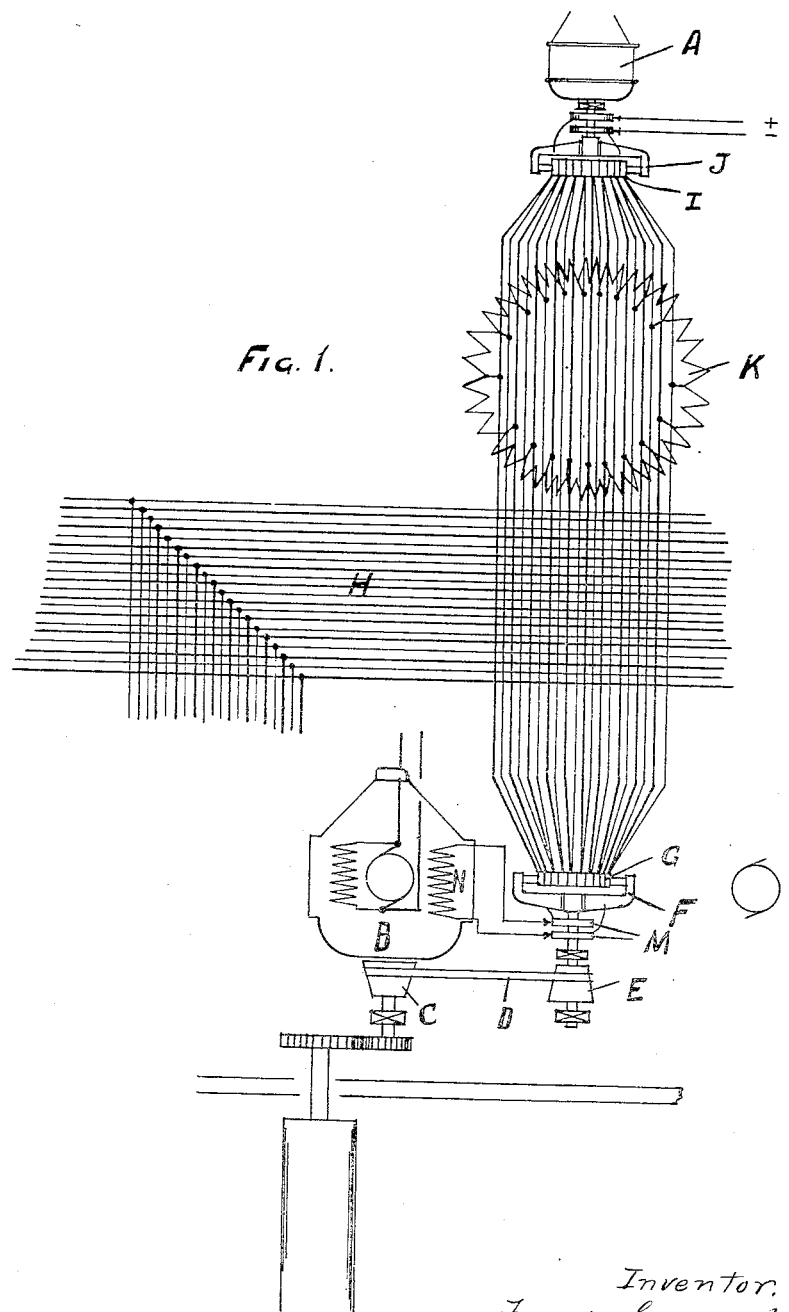

July 14, 1925. 1,545,868
F. G. WARBURTON
CONTROLLING MEANS FOR ELECTRIC MOTORS
Filed Dec. 29, 1919 4 Sheets-Sheet 1

Inventor.
Frank Greaves Warburton
by
Gifford & Bull
his Attorneys

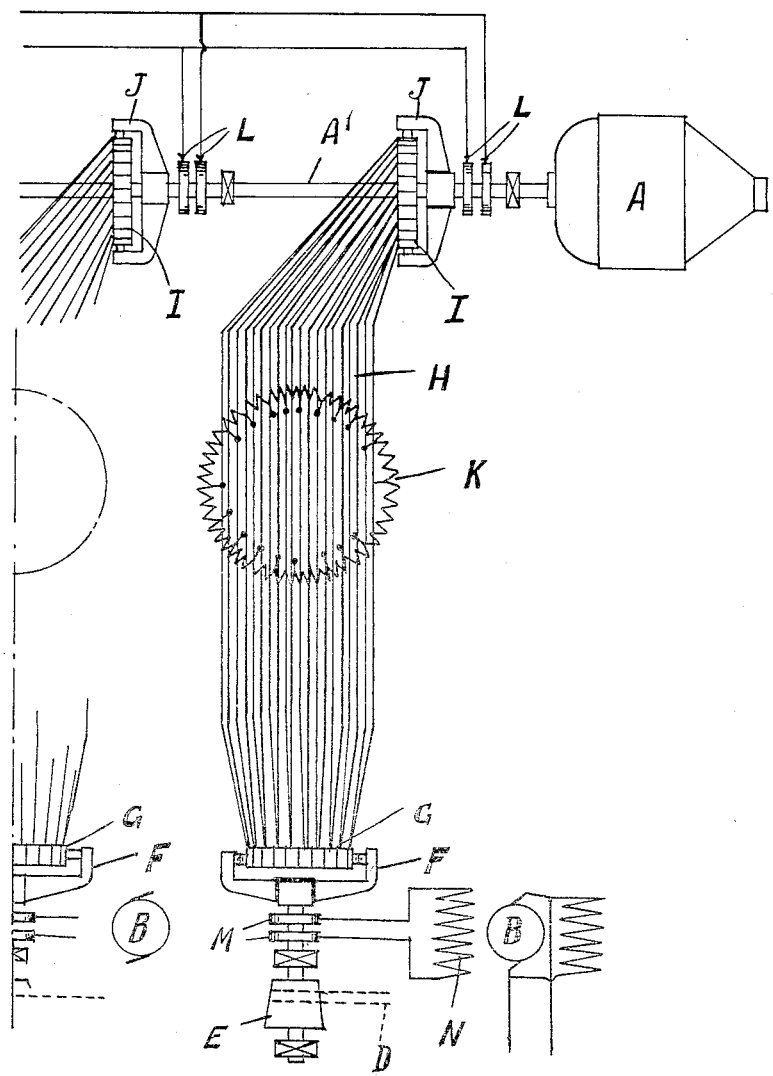

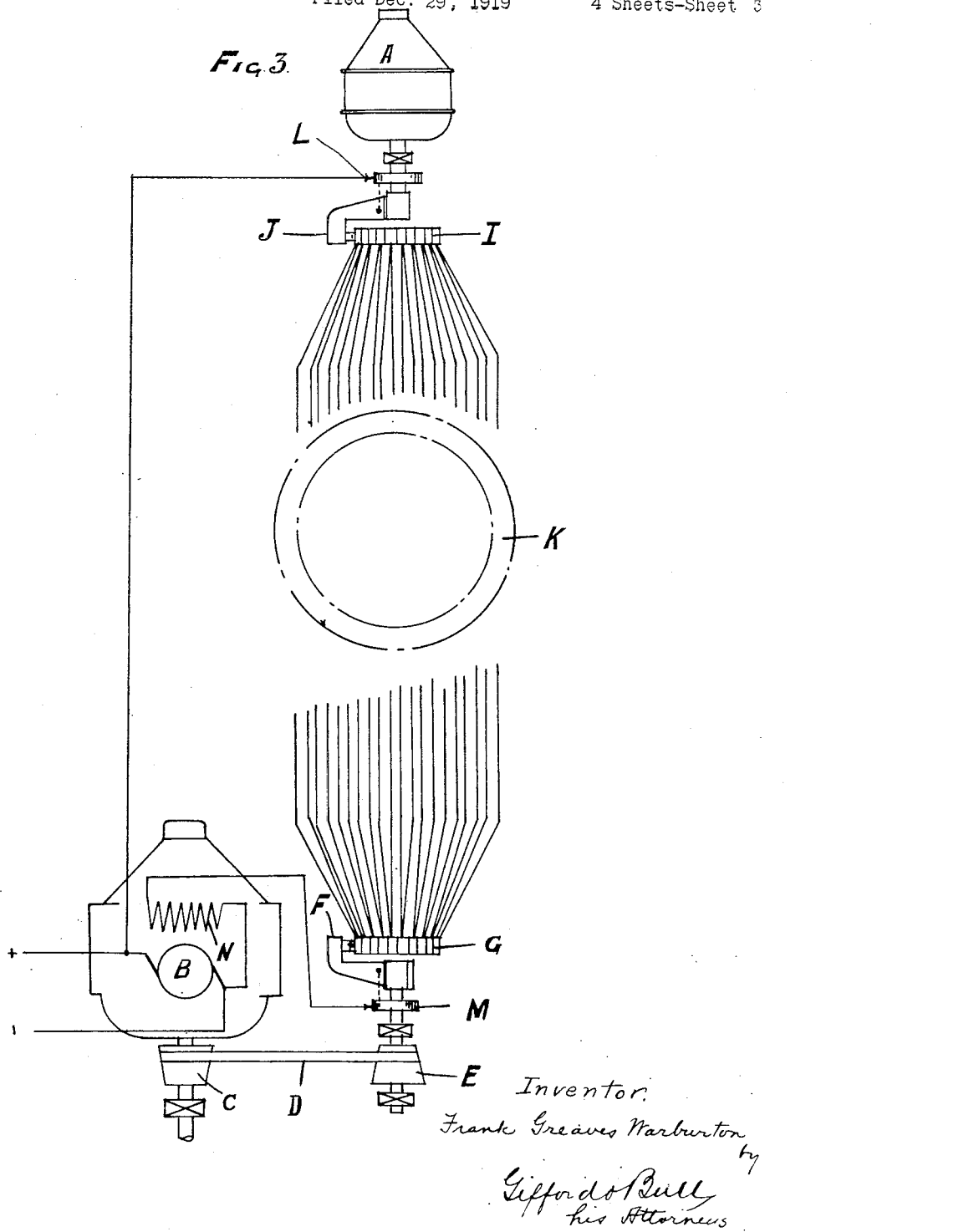

July 14, 1925.
F. G. WARBURTON
1,545,868
CONTROLLING MEANS FOR ELECTRIC MOTORS
Filed Dec. 29, 1919     4 Sheets-Sheet 4
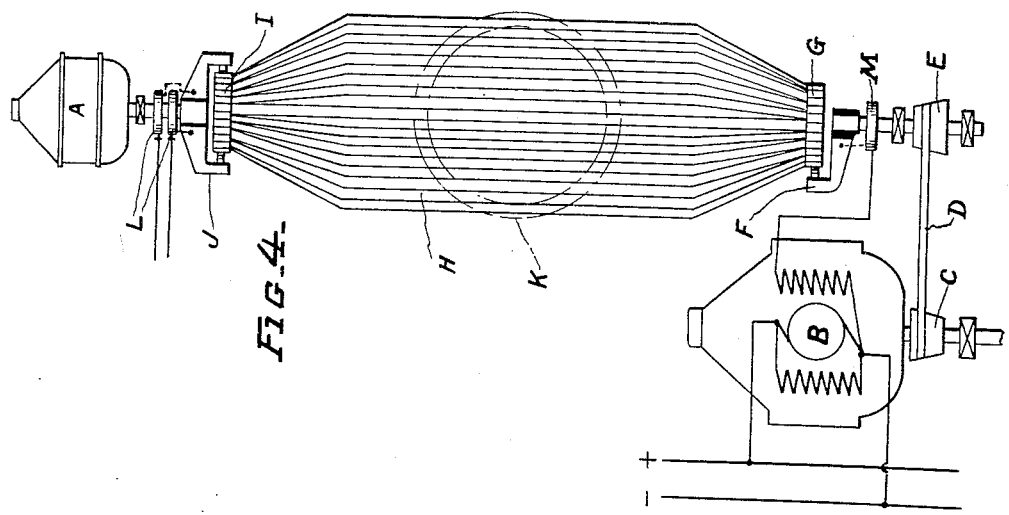
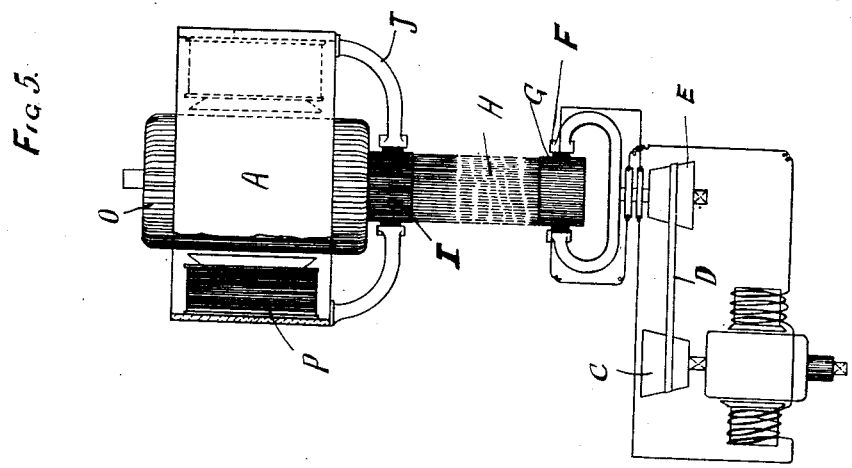
Inventor.
Frank Greaves Warburton
by
Gifford & Bull
his Attorneys Patented July 14, 1925.

1,545,868

UNITED STATES PATENT OFFICE.

FRANK GREAVES WARBURTON, OF LONDON, ENGLAND.

CONTROLLING MEANS FOR ELECTRIC MOTORS.

Application filed December 29, 1919. Serial No. 347,898.

*To all whom it may concern:*

Be it known that FRANK GREAVES WARBURTON, a subject of the King of the United Kingdom of Great Britain and Ireland, and resident of London, England, has invented a certain new and useful Improvement in Controlling Means for Electric Motors, of which the following is a specification.

This invention relates to improvements in the driving mechanism of electrically driven paper machines and other sectional machinery employing one or more motors, and has for its object to provide means for maintaining such motor or motors in speed harmony with a master speed controlling device.

The invention is illustrated diagrammatically in the accompanying drawing in which Fig. 1 represents the central portion of a system employing a single closed resistance circuit for all the motors to be controlled. Fig. 2 represents part of a system employing a separate resistance circuit for each motor to be controlled. Fig. 3 shows a modified arrangement of brushes and commutators, Fig. 4 a further modification, and Fig. 5 a further modification.

The same reference characters denote similar parts in the several views.

Referring to Fig. 1, A denotes a master speed member, herein shown by way of example as an electric motor. B, B, B, denote the motors to be controlled, which motors, merely for the purpose of illustration, are shown located near the master motor, and as shunt-wound motors with a separate control field. C, C, C, indicate cone pulleys driven by the motors B and driving through the belts D cone pulleys E which transmit motion to brushes F adapted to be rotated about commutators G of which one is provided for each motor to be controlled, the commutators G being external to the relative motors B. The commutators G are connected to one another by electrical connections indicated by H. I denotes the master commutator electrically coupled to the connections H. A closed resistance circuit K is electrically coupled to the bars of the commutator I and therefore to the bars of the commutators G of the motors to be controlled. Slip rings L are provided to collect the current from the mains and deliver it through the brushes J to the circuits beyond the master commutator I. For each commutator G there are also provided slip rings M which draw current from the mains by way of the slip rings L and energize the fields N of the motors B. It will be understood that the action in this particular system may be described as potentiometer action.

In the system shown in Fig. 2 employing a plurality of master commutators I and closed resistance circuits K, the master motor A drives a shaft $A^1$ carrying a number of sets of brushes J contacting with master commutators I preferably equal in number to the number of motors to be controlled, the bars of each master commutator I being electrically connected with the bars of the commutator G of the corresponding motor B, there being coupled with each master commutator I a closed resistance circuit K. The arrangement of the slip rings L and M is similar to that shown in Fig. 1.

In Fig. 3 is shown diagrammatically a master motor controlling a single motor in a similar manner. In the system shown in Fig. 3 there are employed a single brush J on the master commutator I, and a single brush F and a single slip ring M for the motor B to be controlled.

An arrangement somewhat similar to that shown in Fig. 3 is shown in Fig. 4 where there are employed a single brush F and a single slip ring M for the motor B to be controlled, two brushes J and two slip rings L being provided for the master commutator I.

As will be understood, the brush or brushes J and the brush or brushes F may be displaced electrically relatively to each other and dependent on the electrical displacement is the quantity of excitation of the field coil N which with the arrangement shown in Fig. 1 may vary from a maximum auxiliary boost north to a maximum auxiliary boost south dependent on the displacement of brushes J relatively to the brushes F. It will be seen, therefore, that if the speed of the brushes F tends to vary as compared with the speed of the brushes J the displacement between the brushes will vary. This relative displacement will put into the field coils N a correction sufficient and opposite to maintain the brushes J and F and the motors to be controlled in exact speed harmony with each other. The purpose of the cone pulleys and belt drive is to provide a means of changing the speed relationship of any motor with the master member and therefore with each other. For the cone pulleys there may of course be substituted any mechanical speed changing device which gives similar results, and the same effect would be obtained if the cone pulleys were in Fig. 2 placed between the brushes J and their common driving member.

As in the arrangement shown in Fig. 5 the commutator or commutators external to the master speed member might be dispensed with and with an electric motor A as the master speed member a similar result would be achieved by coupling the bars of the auxiliary motor commutator or commutators G to the bars I of the normal commutator of the master motor A no closed resistance or resistances then being required as the intensity of excitation of the field or fields N of the motor or motors B to be controlled would similarly depend on relative displacement of the master brushes J and motor brushes F, current flowing through the master motor armature O to the circuit of the motors, the master motor field P being arranged as shown to revolve around a stationary armature O.

What I claim is:

1. In a system of motor control, the combination with an electric motor and a separate speed member, of means responsive to speed variations between the motor to be controlled and the speed member for varying the excitation gradually of the controlled motor, said means comprising stationary commutators and cooperating brushes rotating in speed harmony with the motor to be controlled and the separate speed member respectively, and additional means for varying the permanent speed relationship between said motor and said speed member.

2. In a system of motor control, the combination with an electric motor and a separate speed member, of means responsive to speed variation between the motor to be controlled and the speed member for maintaining said motor and said speed member in relative synchronism, said means comprising commutators and brushes engaging therewith and movable relatively thereto in harmony with the speed of the motor and the speed member respectively and associated with said motor and said speed member, the segments of one commutator being electrically connected to those of the other, resistances connected to the bars of said commutators, and additional means for varying the permanent speed relationship between said motor and said speed member.

3. In a system of motor control, the combination with an electric motor and a separate speed member, of means responsive to speed variation between the motor to be controlled and the speed member for maintaining said motor and said speed member in relative synchronism, said means comprising commutators and brushes engaging therewith and movable relatively thereto in harmony with the speed of the motor and the speed member respectively and associated with said motor and said speed member, conductors electrically connecting the segments of the commutators, resistances electrically connected between the segments of the commutators, and additional means for varying the permanent speed relationship between said motor and said speed member.

4. In a system of motor control, the combination with an electric motor and a separate speed member, two stationary commutators each comprising a plurality of conducting members associated with said motor and said speed member respectively, conductors connecting the conducting members of one commutator to those of the other, rotary brushes engaging the respective commutators and actuated by said motor and said speed member respectively, the parts being constructed and arranged to cause a relative variation in speed between the brushes to vary the field of said motor.

5. In a system of motor control, the combination with an electric motor and a separate speed member, two stationary commutators each comprising a plurality of conducting members associated with said motor and said speed member respectively, conductors connecting the conducting members of one commutator to those of the other, sets of rotary brushes engaging the respective commutators and actuated by said motor and said speed member respectively, the current for the field of said motor passing through said conductors, the parts being constructed and arranged to cause a relative variation in speed between the brushes to vary the field of said motor.

6. In a paper making machine and a system of control therefor, a plurality of rolls, motors for driving the respective rolls, a separate speed member, stationary commutators associated with said speed member and with the respective motors and each comprising a plurality of conducting members, the conductors connecting the conducting members of the commutator associated with the speed member to the conducting members of the commutators associated with the respective motors, rotary brushes engaging the various commutators and actuated by the speed member and by the respective motors, the parts being constructed and arranged to cause a relative variation in speed between the brushes engaging the commutator for the speed member and those engaging a commutator for a given motor to vary the field of that motor.

7. In a system of motor control, the combination with an electric motor and a separate speed member, two stationary commutators each comprising a plurality of conducting members associated with said motor and said speed member respectively, conductors connecting the conducting members of one commutator to those of the other, rotary brushes engaging the respective commutators and actuated by said motor and said speed member respectively, the parts being constructed and arranged to cause a relative variation in speed between the brushes to vary the field of said motor, and means for varying the permanent speed relation between said speed member and said motor.

In testimony whereof I have signed my name to this specification in the presence of two subscribing witnesses.

FRANK GREAVES WARBURTON.

Witnesses:
J. JENKINS,
M. MANSFIELD.